Aug. 27, 1946.　　G. C. WHARTON　　2,406,728
MACHINE FOR FINISHING THE HANDLES OF SHOVELS
Filed Oct. 24, 1941　　3 Sheets-Sheet 1

Inventor:
George C. Wharton.
by Emery, Booth, Townsend, Miller & Weidner,
Attys.

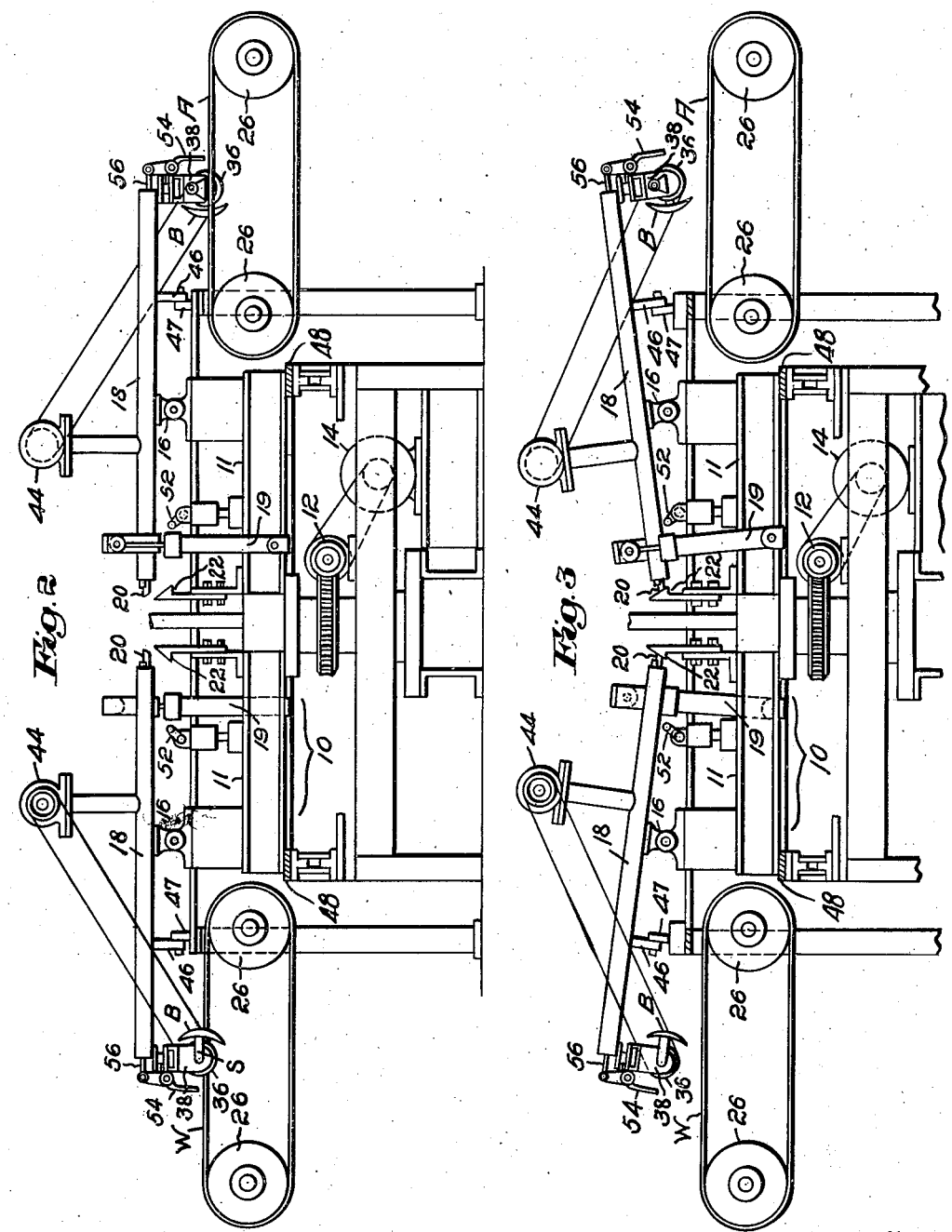

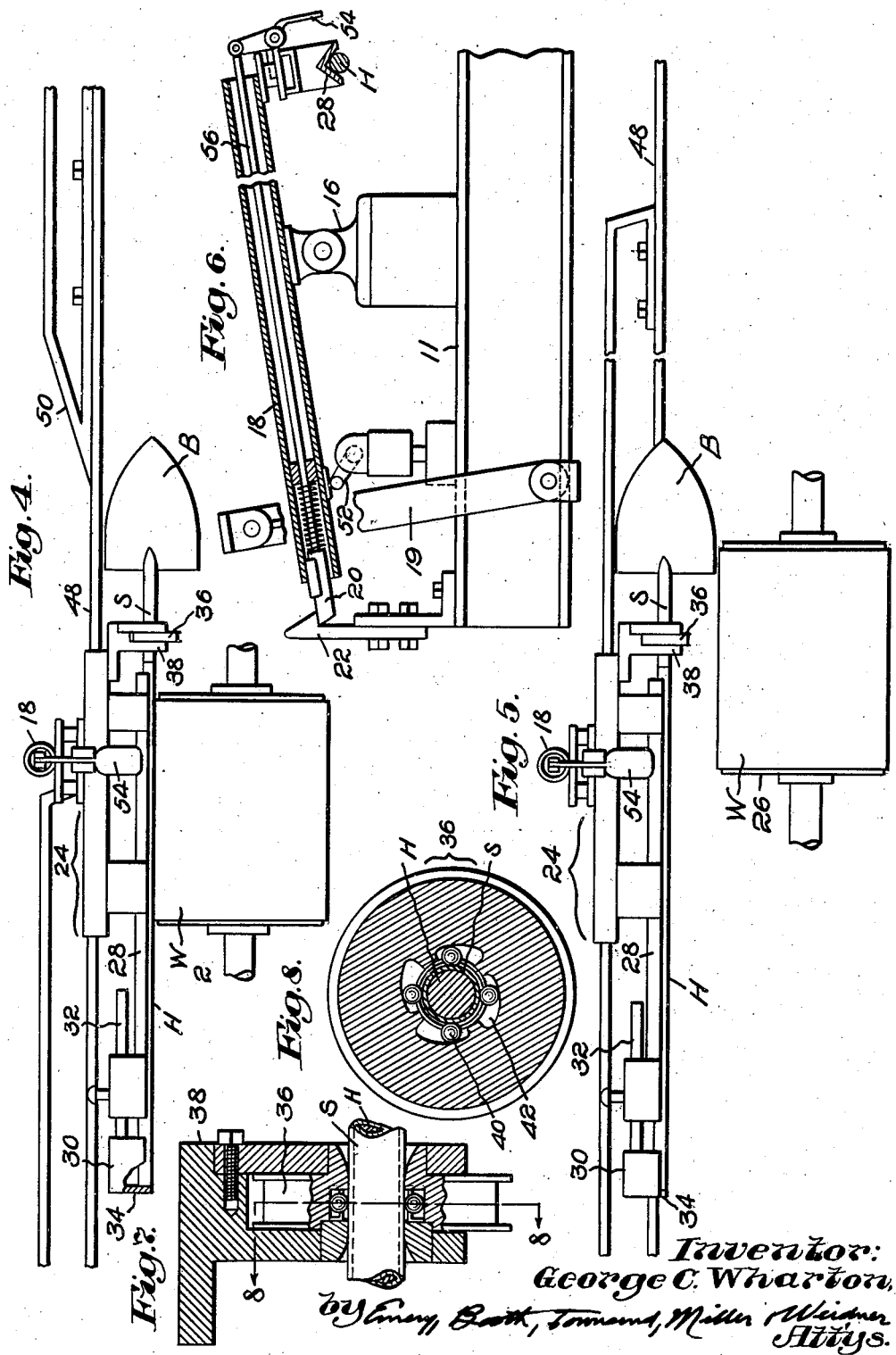

Patented Aug. 27, 1946

2,406,728

UNITED STATES PATENT OFFICE 2,406,728

MACHINE FOR FINISHING THE HANDLES OF SHOVELS

George C. Wharton, Parkersburg, W. Va., assignor to Ames Baldwin Wyoming Co., Parkersburg, W. Va., a corporation of Delaware Application October 24, 1941, Serial No. 416,344

22 Claims. (Cl. 51—145)

This invention relates to the finishing of the handles of shovels or similar headed tools, and the object is to provide a machine whereby the wooden handles of shovels, more particularly complete shovels, that is, shovels or the like with handle and blade permanently secured together, may be smoothed or polished as by sanding or waxing or by both sanding and waxing. The machine is also adapted for the finishing of handles as such as, for instance, handles which are to be sold for repair purposes, especially when such handles are of the bent type and embody a cranked or offset portion which presents a problem in handling somewhat similar to that presented by an attached blade. However as I anticipate that the major field of utility of the machine will be found in the case of complete shovels, I shall for convenience hereinafter refer to them as the articles being operated upon.

My invention will be well understood by reference to the following description of the illustrative embodiment thereof shown by way of example in the accompanying drawings, wherein:

Fig. 2 is a section on line 2—2 of Fig. 1;

Fig. 3 is a similar section in a different plane showing the shovel carriers in a different position;

Fig. 4 is a fragmentary view looking in the direction of the arrow 4 in Fig. 1;

Fig. 5 is a similar view with the parts in a different position;

Fig. 6 is a broken enlarged view of a portion of Fig. 3, with part in section;

Fig. 7 is an enlarged view of a portion of Fig. 4, partly in section; and

Fig. 8 is a section on line 8—8 of Fig. 7.

Figure 1:
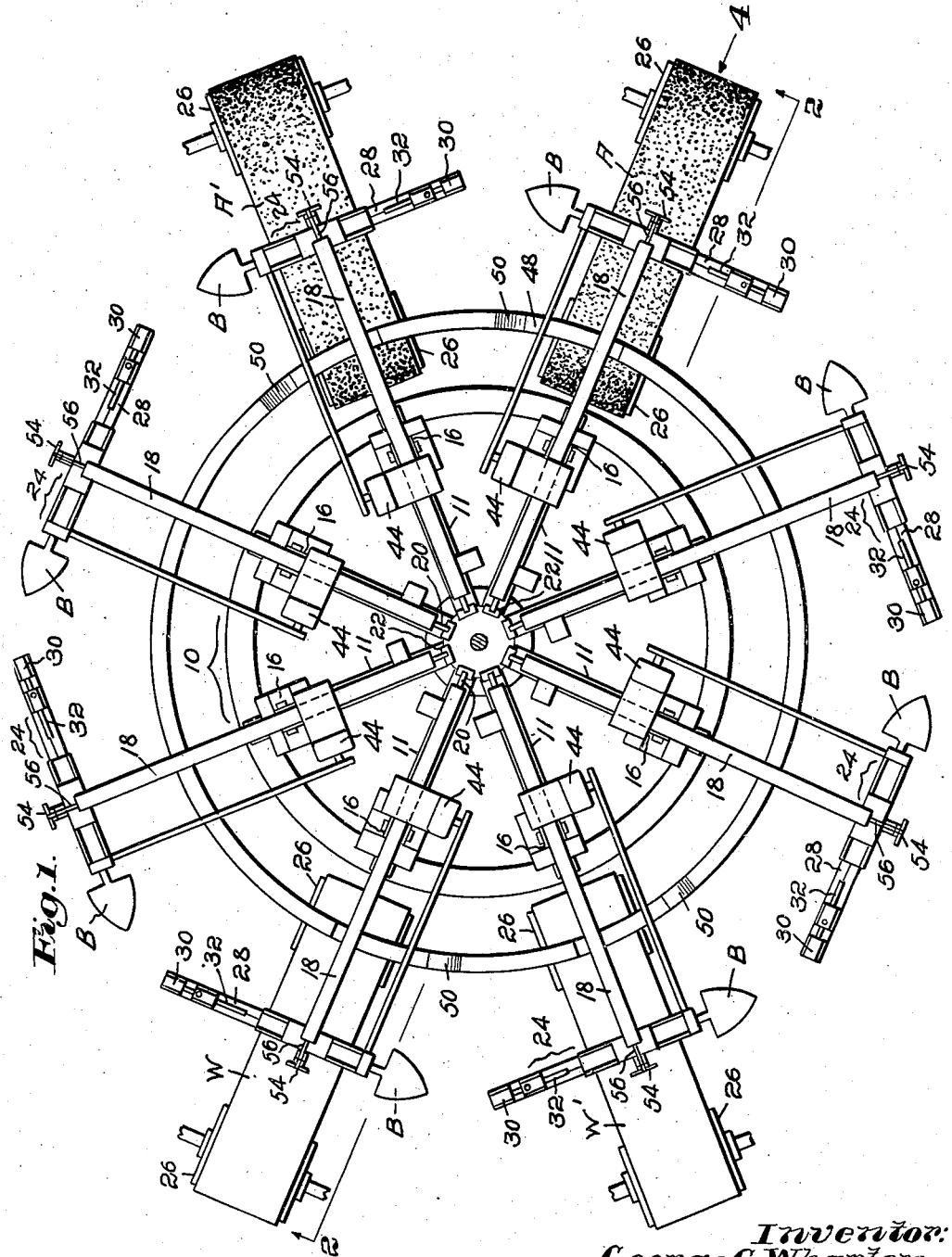
Fig. 1 is a plan view, partly diagrammatic in that various details have been omitted to simplify the figure.

The particular machine here shown is adapted both to sand and to wax the shovel handles and for convenience in the following claims I shall denote either operation or a similar operation by the word "polishing." The machine shown is designed to operate on shovels of the type having a long straight handle without any cross-bar or D grip at its outer end, although the invention is not limited thereto. In my copending application, Serial No. 416,345, subsidiary hereto, I show a machine more particularly designed for handling shovels of the D-handle type. For convenience I shall refer to the object operated on as a "shovel" although the machine may be operated to perform a like operation on tools similarly embodying a handle and a head. Thus a rake, a hoe or a hay fork might be handled in the same manner as a long-handled shovel while a spading fork is similar to a D-handled shovel.

Shovel handles obviously should be finished smooth. In the better grade goods they are also usually finished by waxing since besides certain practical objections to painting it is associated in the mind of the public with lower grade goods wherein the coating conceals defects in quality. While many attempts have been made to permit the blade and handle to be finished separately before assembly, the finish is likely to be marred in the process of securing the blade and handle together, and therefore the finishing of the handle has been performed on the complete shovel which has been presented by hand to suitable buffing devices. Since a shovel, when held otherwise than in the normal digging position, is awkward and unwieldy, the finishing has been difficult and expensive. Machines in accordance with the present invention in contrast permit rapid, economical polishing of the handle in the complete shovel.

In the figures, especially Figs. 4 and 5, will be observed a shovel of the long-handle type embodying the blade B from the back edge of which projects a metallic socket S integral with or rigidly secured to the blade and receiving the wooden handle H. The socket is cranked or bent to provide the proper lift to the shovel. Outwardly of the socket the handle H extends as an axially straight stem or shank, usually corresponding to a solid of revolution and which in the case of a long-handled shovel as shown continues to the distal end. The presence of the enlarged blade disposed at an angle to the axis of the shank renders the polishing operation on the shank difficult.

The machine which I am about to describe in detail provides for mechanically presenting the straight shank of the shovel handle to a succession of polishing surfaces and rotating it about its axis in contact therewith, while the blade is prevented from fouling such surfaces and during the polishing operation gyrates idly at a side thereof.

Referring now to the drawings and particularly to Figs. 1, 2 and 3, the mechanism there shown for supporting the shovels and moving them to and from polishing instrumentalities comprises a revolving turret 10 which herein includes an eight-arm spider formed of I beams 11 and which is revolved by worm gearing 12 by an electric motor 14, preferably continuously and either at a constant or at a variable speed. The arms 11 of the spider carry short bearing blocks 16 on which are pivoted radiating arms 18, conveniently in the form of tubes, which arms are capable of swinging in vertical planes, their motion conveniently being regularized by dashpot cylinders 19 attached at their inner ends. Spring pressed latches 20 at the inner ends of the arms may be provided which may engage hook-like keepers 22 on the turret, when the inner ends of the arms are sufficiently depressed, to hold the outer ends elevated. Depending from the outer ends of the arms are holders 24 for the shovels, which holders will be described more in detail hereinafter and which position the straight shanks thereof in approximately tangential positions relative to the circular path of the outer ends of arms 18.

I have herein shown (see Fig. 1) ranged about the turret four polishing belts, two of which, A and A', may be considered to be sanding belts having surfaces of suitable abrading material and two, W and W', waxing belts. The lengths of these belts extend substantially radially to the turret, they being mounted on suitable pulleys 26, one of which is driven by an electric motor or other power not shown. Also I have not shown in the figures the supporting frames for these pulleys. The path of the shovel holders crosses the upper runs of these belts between their supporting pulleys. The several polishing belts are so positioned as seen in Fig. 1, as to leave a substantial portion of the circumference of the turret at the lower portion of that figure unobstructed to provide a station for an operative at which shovels may be inserted in the holders or removed therefrom after they have travelled around the circuit and been subject to the action of the belts.

Referring now to Figs. 4 and 5, the holders 24 for the shovels herein each comprises a downwardly facing V-shaped support 28 in which the shank of the shovel may be cradled with the lower portion of the circumference exposed and in which it may turn so that all parts of the circumference may be subjected to the action of a polishing belt when the handle is moved downwardly against the same. This V-shaped support is herein shown as in two parts, there being an auxiliary end portion 30 carried at the left-hand end viewing Figs. 4 and 5 by an adjustably sliding arm 32, which portion also has an end wall 34 with which the distal end of the shank may make contact. To maintain the shovel in the holder an open-centered pulley 36 is provided journalled in depending brackets 38 at the right-hand end of the part 28. The shovel shank may be threaded through the pulley from the right-hand side, viewing Figs. 4 and 5. The end wall 34 of the part 30, which has been suitably adjusted in accordance with the length of the handle being operated on, forms a stop so that a portion of the socket S coaxial with the straight portion H of the handle comes to rest within the hollow center of the pulley and the wooden shank is completely exposed at the left of the same, viewing the figures. As best seen in Figs. 7 and 8, the pulley 36 is formed as a one-way clutch or clamp so that when turned in one direction it will grip or grasp the socket S. For this purpose balls 40 are retained by a suitable cage in the slots 22 which open toward the center of the pulley and are tapered in depth. If the pulley is rotated clockwise, viewing Fig. 8, the balls will travel toward the shallow portion of the slot and project to grip the socket S. If it is turned in the other direction this grip will be released. Electric motors 44 carried by the arms 18 are belted to the pulleys 36. If energized after a shovel is inserted, the pulleys will rotate clockwise, viewing Fig. 8, the socket will be gripped by balls 40 and the shovel will be rotated about the axis of handle H, which turns in the cradle provided by the V-shaped support 28. If the motor is deenergized, the shovel comes to rest, and if grasped by the blade, which provides a convenient handle for the purpose, a slight turn in a counterclockwise direction releases the grip of the balls 40 therein and permits the shovel to be withdrawn toward the left in Figs. 4 and 5.

Depending elements 46 on the arms arranged slightly outboard of the circumference of the turret carry cam followers 47 adapted to run on a fixed annular cam 48 having suitable rise portions, such as that marked 50 in Figs. 4 and 5, which control the angular position of the arms in their vertical plane and thus the elevation of the holders carrying the shovel. I have deemed it unnecessary to illustrate in detail the position and extent of these rise portions as they will be sufficiently obvious from the series of positions of the arms controlled thereby referred to in the description as it proceeds.

Further details of the mechanism may most conveniently be explained in connection with a description of the operation. Let us suppose that in the operation of the machine with the turret revolving counterclockwise, viewing Fig. 1, a shovel in its holder comes to about a seven thirty o'clock position, viewing that figure, after having traversed the belts. A suitable rise on the cam 48 lifts the outer end of arm 18, depressing the inner end thereof sufficiently so that the latch 20 engages the hook 22, the arm thus being held with its outer end in an elevated position. In this movement the arm 28 strikes the operating arm 52 of an electric switch controlling the circuit to the motor 44 which drives the pulley 36 of the holder 24, deenergizing the motor so that the shovel in the holder comes to the operative in a stationary position as regards revolution about the axis of the handle. If it is grasped by the blade, a slight turn releases the grip of the balls 40 of the pulley and the shovel may be withdrawn and a new one inserted into the holder by inserting the distal end of the handle in the hollow of the pulley and moving the shovel in until the distal end contacts the end wall 34 of the holder. The shovel being inserted, the operative rocks lever 54 at the outer end of the arm 28 (see Fig. 6), which by means of a connecting rod 56 housed within the hollow thereof retracts the latch 20 and permits the outer end of the arm to sink downwardly. The switch arm 52 is released and the switch moves to a closed position, energizing the motor 44 so that the shovel approaches the belt A revolving about the axis of the shank and with its vertical position under control of the fixed annular cam 48. As it approaches the belt, it is held in the raised position of Figs. 5 and 3 to permit the blade of the shovel to clear the belt. When, however, the blade of the shovel and the pulley 36 and its bracket 38 pass the right-hand side of that belt, viewing the figure, the cam follower 47 rides to a lower portion of the annular cam 48 so that the wooden stale H is lowered into contact with the belt, as seen in Figs. 4 and 2, and pressed against the same and it is carried axially throughout its length transversely of the belt, being rotated about its axis and also subject to the polishing motion of the driven belt. After it has passed the belt it is again raised to the position of Fig. 5 to permit the blade to clear the succeeding belt, the operations are repeated for each belt and afterwards the arm is latched up and the motor 44 deenergized as previously described.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A polishing machine for the wooden handles of shovels comprising a revolving turret, a polishing belt located in a plane substantially radial to the turret, a pivoted arm having at its outer end a depending holder to receive the shovel to carry the same along in the general direction of its length as the turret revolves, and means for controlling the position of the arm as the turret revolves to contact a selected portion of the length of the shovel only to said belt.

2. A polishing machine for the wooden handles of shovels comprising a revolving turret, a polishing belt located in a plane substantially radial to the turret, a pivoted arm having at its outer end a depending holder to receive the shovel to carry the same along endwise as the turret revolves and comprising a rotary chuck for rotating the shovel about the axis of the handle, means for driving the chuck, which driving means idles during a part of the revolution of the turret when the arm is remote from the belt to provide an unloading and reloading station, and means for controlling the position of the arm as the turret revolves to contact a selected portion of the length of the shovel only to said belt.

3. A polishing machine for the wooden handles of shovels comprising a revolving turret, a polishing belt located in a plane substantially radial to the turret, a pivoted arm having at its outer end a depending holder to receive the shovel to carry the same along endwise as the turret revolves and comprising a rotary chuck for rotating the shovel about the axis of the handle, a catch for holding the arm with the holder in elevated position, means having a manually actuatable controlling portion exposed at the exterior of the turret for releasing the catch, means for driving the chuck when the arm is released from said elevated position, and means for controlling the position of the arm as the turret revolves to contact a selected portion of the length of the shovel only to said belt.

4. A polishing machine for the wooden handles of shovels comprising a revolving turret, a polishing belt located in a plane substantially radial to the turret, a pivoted arm having at its outer end a depending holder to receive the shovel to carry the same along endwise as the turret revolves and comprising a rotary chuck for rotating the shovel about the axis of the handle, a catch for holding the arm with the holder in elevated position, means having a manually actuatable controlling portion exposed at the exterior of the turret for releasing the catch, a motor for driving the chuck, a switch for the motor circuit which is closed when the arm is released, and means for controlling the position of the arm as the turret revolves to contact a selected portion of the length of the shovel only to said belt.

5. A polishing machine for the wooden shanks of complete shovels comprising a revolving turret, polishing surfaces located in planes substantially radial to the turret, a set of radiating arms on the turret pivoted on horizontal axes and having at their outer ends holders to receive shovels to carry the same along endwise and across the belt as the turret revolves, cam followers carried by the arms and an annular cam cooperating therewith and having rise portions effective to lift the blades of the shovels over the polishing surfaces and to lower the shanks against the same.

6. A polishing machine for the wooden shanks of complete shovels comprising a revolving turret, polishing surfaces located in planes substantially radial to the turret, a set of radiating arms on the turret pivoted on horizontal axes and having at their outer ends holders to receive shovels to carry the same along endwise and across the belt as the turret revolves, cam followers carried by the arms, an annular cam cooperating therewith and having rise portions effective to lift the blades of the shovels over the polishing surfaces and to lower the shanks against the same, said holders comprising rotary chucks for rotating the shovels about the axes of their shanks, and means for driving the chucks controlled by the position of the arms and effective when the shanks are against the polishing surface.

7. A polishing machine for the wooden shanks of complete shovels comprising a revolving turret, polishing surfaces located in planes substantially radial to the turret, a set of radiating arms on the turret pivoted on horizontal axes and having at their outer ends holders to receive shovels to carry the same along endwise and across the belt as the turret revolves, said holders comprising rotatable clutches for rotating the shovels about the axes of their shanks, manually releasable latches for holding said arms with the holders elevated, motors for driving the clutches, switches for the motors open when said arms are in latched up position and closing when they are released, cam followers carried by the arms and cam rises cooperating therewith effective to lift the blades of the shovels over the polishing surfaces and to lower the shanks against the same and, at a location remote from said surfaces, to raise the arms to latching position.

8. A polishing apparatus for the shanks of shovel handles comprising a pair of polishing belts, a rotary chuck having means for grasping the work at a substantially single location beyond the straight portion of the shank to retain and carry the same with the axis of the shank extending in the direction of the axis of revolution, means to rotate the chuck, means for moving the chuck bodily to apply the handle shank from above in crossing relation to the upper runs of the belts successively, and means for lifting the work held by the chuck in the parts of its path beyond and between the belts whereby fouling of the belts by parts offset from said axis is prevented.

9. Apparatus for polishing the straight wooden handle portion of a complete shovel comprising a driven polishing belt, means for gripping a shovel at a substantially single point remote from said portion to retain and carry the same, means to rotate said gripping means about the axis of the said portion of the shovel so gripped as a center, means for moving the gripping means transversely of the belt, and means for effecting relative movement of the belt and gripping means in a direction transverse to the plane of the extended upper run of the belt to cause the blade of the shovel to clear the belt and to cause the rotating shank to contact with the latter with the attached blade projecting over the edge thereof.

10. Apparatus for polishing the straight wooden handle portion of a complete shovel comprising a driven polishing belt, means for gripping a shovel at a point remote from said portion, means to rotate said gripping means about the axis of the said portion of the shovel so gripped as a center, means for traversing the gripping means to feed the gripped shovel substantially lengthwise of the shank portion and transversely of the belt, and means for effecting relative vertical movement of the belt and gripping means to cause the blade of the shovel to clear the belt and to cause the rotating shank to contact with the latter with the attached blade projecting over the edge thereof.

11. In a polishing machine for the wooden shanks of complete shovels the constituent mechanism for holding the shovels and moving them in operative relation to a polishing surface comprising a peripherally supported chuck open at opposite ends thereof to receive the blade socket of the shovel with the blade and handle projecting at opposite sides thereof respectively, and responsive to relative rotative movement of the socket and chuck to grip and release the said socket respectively, and means to rotate the chuck about the axis of the shank of the shovel so gripped as a center.

12. In a polishing machine for the wooden shanks of complete shovels the constituent mechanism for holding the shovels and moving them in operative relation to a polishing surface comprising a peripherally supported chuck open at opposite ends thereof to receive the blade socket of the shovel with the blade and handle projecting at opposite sides thereof respectively, and responsive to relative rotative movement of the socket and chuck to grip and release the said socket respectively, a bearing at one end of the chuck to engage the shank which is gripped therein at one side thereof only to aid in supporting it against the reaction of the polishing surface exerted on the other side, and means to rotate the chuck about the axis of the shank of the shovel so gripped as a center.

13. In a polishing machine for the wooden shanks of complete shovels the constituent mechanism for holding the shovels and moving them in operative relation to a polishing surface comprising a rotatably mounted wheel having a central through opening into which the shank may be inserted to project at one end of the chuck with the blade projecting at the other end, and means carried thereby responsive to rotation of the wheel in one direction to grip the part within the opening.

14. In a polishing machine for the wooden shanks of complete shovels the constituent mechanism for holding the shovels and moving them in operative relation to a polishing surface comprising a rotatably mounted wheel having a central through opening into which the shank may be inserted to project at one end of the chuck with the blade projecting at the other end, means carried thereby responsive to rotation of the wheel in one direction to grip the part within the opening, and means remote from the wheel for engaging the shank at one side thereof only to aid in supporting the same against reaction of the polishing surface exerted from the other side.

15. A polishing machine for the straight wooden shanks of handles of complete shovels comprising a rotary chuck having a through opening to receive a portion of the shovel remote from the shank and between the ends of the shovel and gripping elements movable to engage the portion so received, said chuck in itself serving when closed to retain and carry the shovel with the shank extending in the direction of the axis of rotation, a polishing surface, means for moving the chuck bodily to carry the shank held therefrom successively to, over and away from the surface, and means for rotating the chuck while the shank contacts the surface.

16. A polishing machine for the straight wooden shanks of handles of complete shovels comprising a rotary chuck into which the blade extension by which the shank is secured to the blade of the shovel may be entered with the shank projecting at one end thereof and the blade at the other, the chuck having gripping elements for closure on the blade extension and serving when closed to support the shank extending in the direction of the axis of rotation, a polishing surface, means for moving the chuck bodily to carry the shank held therefrom successively to, over and away from the surface, and means for rotating the chuck while the shank contacts the surface.

17. A polishing machine for the straight wooden shanks of handles of complete shovels comprising a rotary chuck having gripping elements for closure on a portion of the shovel remote from said shank and in itself serving when closed to retain and carry the shovel with the shank extending in the direction of the axis of rotation, a polishing surface, means for moving the chuck bodily to carry the shank held therefrom successively to, over and away from the surface, means for rotating the chuck while the shank contacts the surface, and means contacting solely the side of the shovel shank remote from said surface and engaging the same remote from the chuck to assist in maintaining the shank against the reaction of the surface.

18. An apparatus for polishing the straight wooden shanks of shovel handles in complete shovels comprising a chuck to grasp the shovel at a substantially single location along its length and outwardly of said wooden portion and itself serving to retain and carry the shovel with the shank projecting, means to rotate the chuck about the axis of the wooden portion, a polishing surface, and means for moving the chuck bodily relatively to the surface to contact the wooden portion with the surface, with the blade disposed beyond the same.

19. Apparatus for polishing the straight wooden portion of a shovel handle which has associated therewith an offset part comprising a driven polishing belt, means for gripping the work at a substantially single point remote from the straight portion which is to be polished, said gripping means acting to retain and carry the work, means to rotate the gripping means about the axis of said portion as a center, means for traversing the gripping means to feed the work substantially lengthwise of said straight portion and transversely of the belt and means for effecting relative movement of the belt and gripping means in a direction transverse to the plane of the extended upper run of the belt to cause the offset part to clear the belt and to cause the rotating straight portion to contact with the latter with the offset part projecting over the edge thereof.

20. Apparatus for polishing the straight wooden portion of a shovel handle which has associated therewith an offset part comprising a rotary chuck having gripping elements for closure on the work at a substantially single point remote from the straight portion to be polished and serving when closed to carry the work and to support said portion extending in the direction of the axis of rotation, a polishing surface, means for moving the chuck bodily to carry the said straight portion successively to, over and away from the surface, means for rotating the chuck while said portion contacts the surface, and means contacting solely the side of said straight portion away from said surface and engaging the same remote from the chuck to assist in maintaining the shank against the reaction of the surface.

21. Apparatus for polishing the straight wooden portion of a shovel handle which has associated therewith an offset part comprising a chuck to grasp the work at a substantially single location along its length outwardly of the straight portion to be polished and itself serving to retain and carry the work with said straight portion projecting, means to rotate the chuck about the axis of the said portion, a polishing surface and means for effecting relative bodily motion between the chuck and the surface to contact the straight portion with the surface with the offset portion beyond the same.

22. A polishing machine for the straight portions of wooden handles for shovels which have an offset portion comprising a rotating chuck open at either side of its plane of rotation into which the work may be inserted to be gripped by the chuck at a point therealong with the straight portion projecting at one side and the offset portion at the other, a polishing surface, means for traversing the work held by the chuck over the polishing surface with the straight portion in contact therewith, and means for rotating the chuck held work about the axis of said straight portion during such contact.

GEORGE C. WHARTON.